United States Patent [19]
Stein et al.

[11] Patent Number: 5,382,096
[45] Date of Patent: Jan. 17, 1995

[54] BEARING FOR A HEATED ROLL

[75] Inventors: Heinrich Stein, Monchen-Gladbach; Rolf Van Haag, Kerken; Dieter Junk, Kreuztal, all of Germany

[73] Assignee: Sulzer Papertec Krefeld GmbH, Krefeld, Germany

[21] Appl. No.: 257,345

[22] Filed: Jun. 9, 1994

[30] Foreign Application Priority Data

Jun. 14, 1993 [DE] Germany .............................. 4319579

[51] Int. Cl.6 .............................................. F16C 32/06
[52] U.S. Cl. .................................. 384/116; 384/100; 384/905
[58] Field of Search ................. 384/100, 116, 114, 118, 384/99, 905, 108, 111, 117

[56] References Cited

U.S. PATENT DOCUMENTS

| | | | |
|---|---|---|---|
| 3,909,080 | 9/1975 | Hällnor et al. | 384/116 |
| 4,175,800 | 11/1979 | Chaffee et al. | 384/116 |
| 4,530,227 | 7/1985 | Schlatter et al. | 384/117 X |

FOREIGN PATENT DOCUMENTS 0158051  4/1988  European Pat. Off.

Primary Examiner—Thomas R. Hannon
Attorney, Agent, or Firm—Darby & Darby

[57] ABSTRACT

A bearing for a heated calendar roll comprises a bearing ring having a first surface. The bearing is rotatable about an axis. A first radially fixed hydrostatic bearing arcuate segment has a first surface which mates with the first surface of the bearing ring. The hydrostatic bearing has at least one bearing pocket. The bearing pocket has a device for permitting hydraulic fluid to flow into the at least one bearing pocket. The hydrostatic bearing is disposed substantially at a circumferential position with respect to the bearing which corresponds to a bearing load from the calendar roll. A second hydrostatic bearing arcuate segment has a first surface which mates with the first surface of the bearing ring. The second hydrostatic bearing has a first radially adjustable bearing pocket. The radially adjustable bearing pocket has a device for permitting hydraulic fluid to flow into the radially adjustable bearing pocket. The second hydrostatic bearing is disposed substantially diametrically opposite to the first hydrostatic bearing. A running gap is formed between the first surface of the first hydrostatic bearing and the first surface of the bearing ring. The running gap has a gap height which varies from a middle of the running gap toward an edge of the running gap such that at the beginning of a heating cycle, the middle gap height is less than the edge gap height, and in a heated state of the calendar roll the middle gap height is greater than the edge gap height.

7 Claims, 5 Drawing Sheets

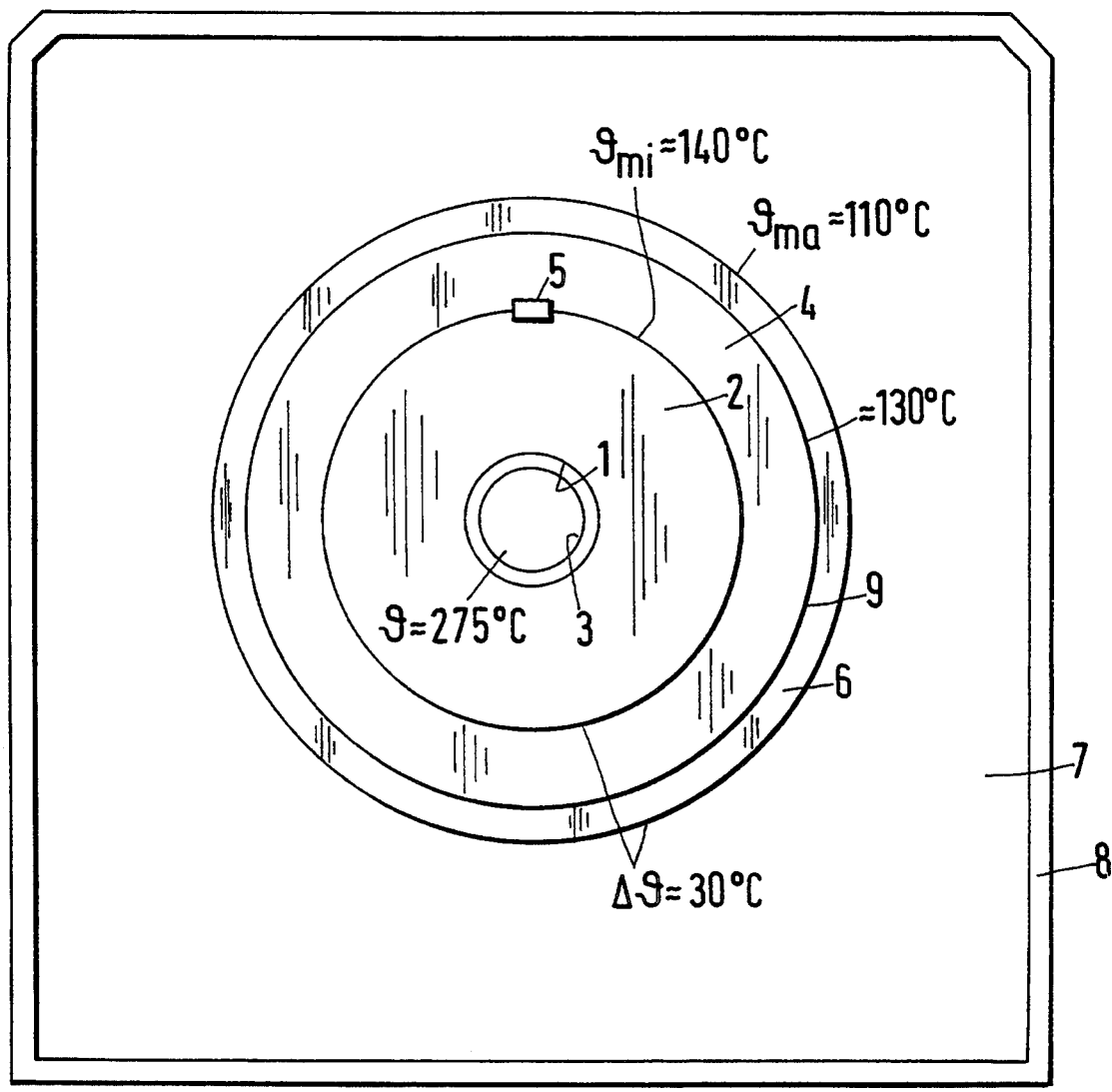

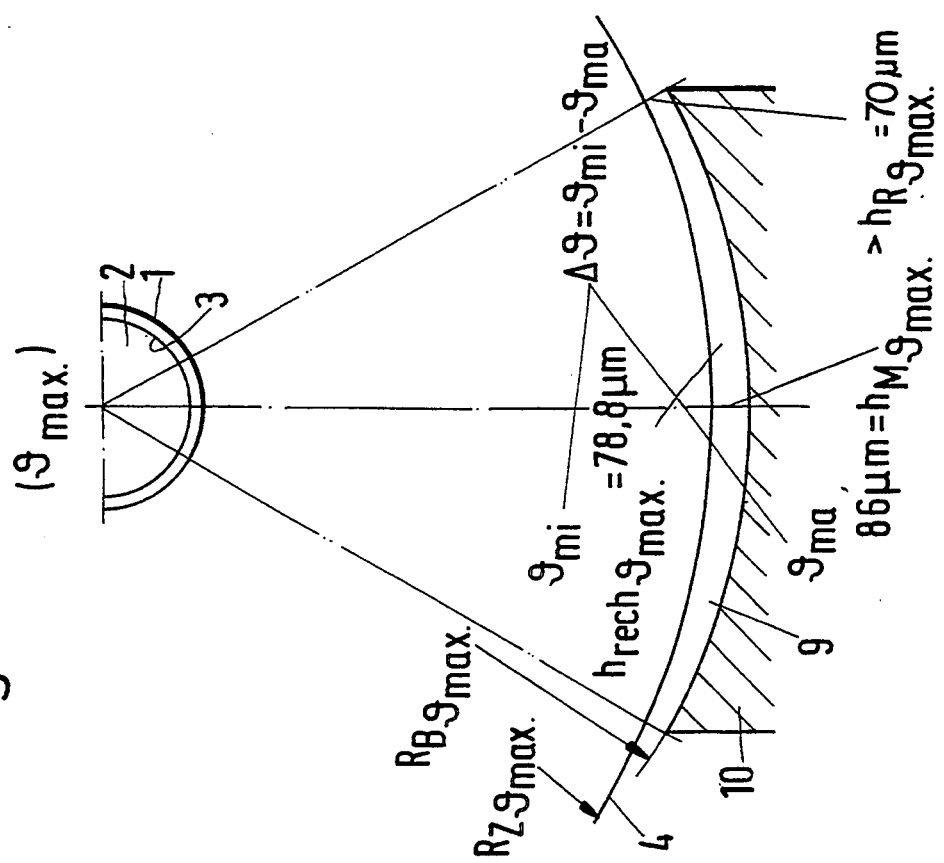
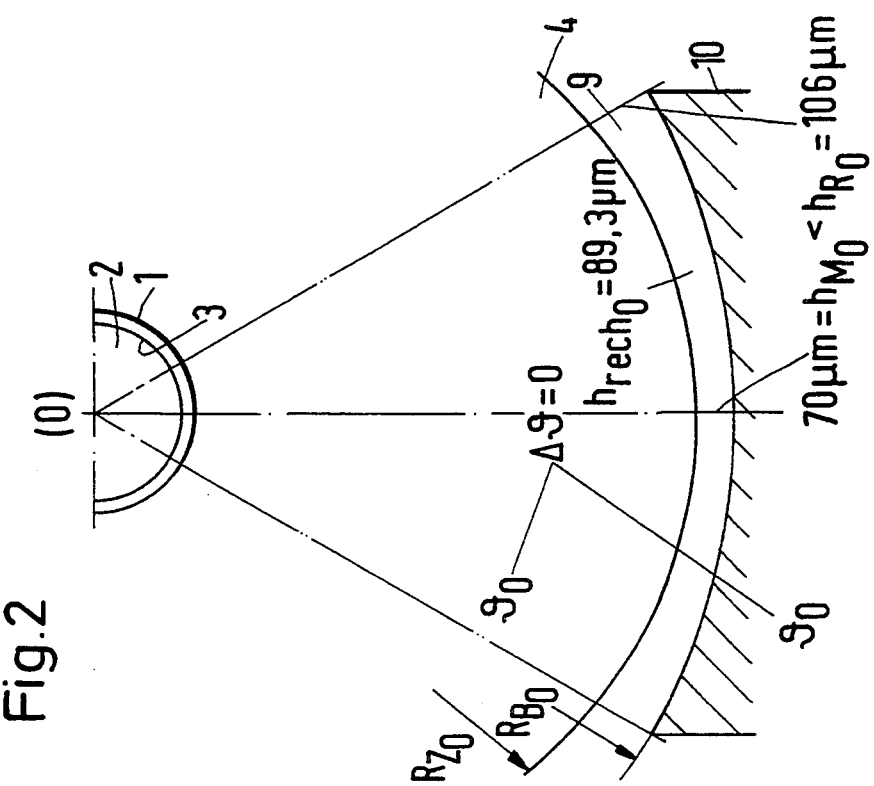

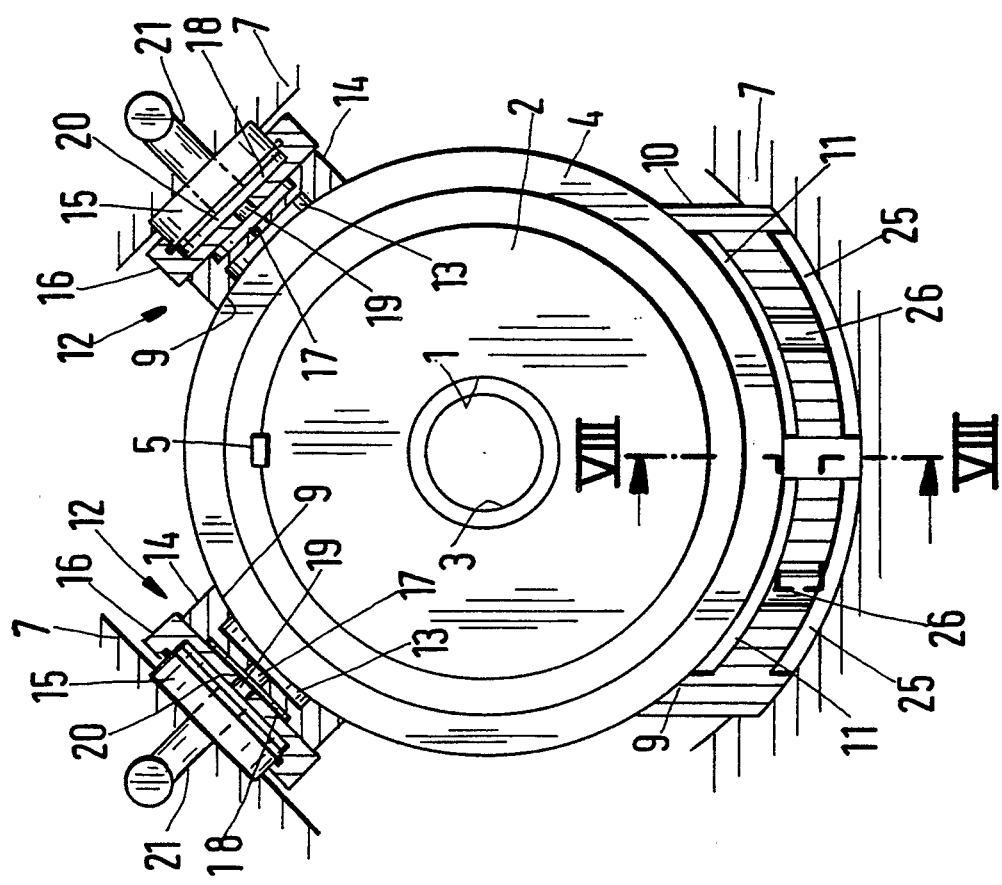

BEARING FOR A HEATED ROLL

FIELD OF THE INVENTION

The present invention relates to a bearing for a heated roll. More specifically, the present invention relates to a bearing for a calendar roll that has a varying diameter difference between a stationary and a rotating running surface, where the rotating running surface is a bearing ring.

BACKGROUND OF THE INVENTION

Roller bearings have been used in connection with heated rolls of compact calendars. In order to manufacture a roller bearing having a satisfactory life span, the bearings have to be dimensioned to such a magnitude that the measurements of the bearing housings, toward the roll space, exceeds the roll diameter and thereby limit the available construction space or the counter roll bearings. This solution is unacceptable, for example, for use in an equally spaced outer bearing for the drum of an anti-deflection roll.

Patent No. EP-PS 0 158 051 is directed to a bearing for a washing drum for goods to be washed in cold and hot water. The bearing has a varying diameter difference between a stationary and a rotating running surface, where the rotating running surface is formed by a drum wall which serves as a bearing ring. A section of the stationary running surface is formed by a first hydrostatic bearing segment having a bearing pocket with oil flowing therethrough and is disposed on the side facing the running gap. In an opposite circumferential area, a further section of the stationary running surface is formed by two further hydrostatic bearing segments which also have bearing pockets with oil flowing therethrough and is also disposed on the side facing the running gap. Each of the three bearing segments is radially yieldable as well as adjustable to center the bearing and to equalize the diameter differences.

SUMMARY OF THE INVENTION

An object of the present invention is to create a more compact bearing construction. According to the present invention, the object is solved in that one section of the stationary running surface is formed by at least one radially fixed hydrostatic bearing segment having at least one bearing pocket for flow of oil therethrough and is disposed on the side facing the running gap and also in a circumferential area that is subjected to a load on the bearing. In a diametrically oppositely disposed circumferential area, a further section of the stationary running surface is formed by at least a second hydrostatic segment with a radially adjustable bearing pocket with oil flowing therethrough and has a bearing shoe facing the running gap. The running gap in a radial and/or axial medial plane of one or each bearing pocket of the first bearing segment is smaller at the beginning of a heating cycle and is smaller at the edge of the bearing pocket when the roll is in a heated state.

The hydrostatic bearing of the present invention has, besides being of a more compact construction, a higher resistance to wear and a better damping effect than a roller bearing. Thus, the radially fixed bearing segment serves to center the bearing and the radially adjustable bearing shoe of the second hydrostatic bearing segment creates the required minimum pre-tensioning of the bearing pocket by controlling an oil volume flow with minimized compensation. For example, the compensation is based on the thermally induced fluctuating diameter differences between the inner and the outer bearing parts over the whole working range. The required minimal pre-tensioning is also effected by the direction of the roll's own weight.

Preferably, the running surfaces are arcuate. This shape assures a stable counter force to axial forces, which is analogous to the well known roller thrust bearing.

It is also advantageous for the bearing pocket of the first bearing segment to receive a constant oil volume flow and for the bearing pocket of the second bearing segment to receive a constant oil pressure. The oil deliveries can be achieved by known throttle systems, manifolds or individual pumps.

Preferably, care should be taken that the bearing shoe of the second bearing segment, on its side facing away from the running gap, has a second bearing pocket with oil flowing therethrough and that the second bearing pocket abuts against the moveable part of a piston-cylinder device. In this manner, each bearing shoe is slidingly moveable and, thereby, is practically friction-free and self-centering relative to the bearing ring which is rotating with the journal of the roll. The bearing shoes operate in concert with the diametrically oppositely disposed radially fixed bearing segment or segments.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is an axial view of a closed, in the circumferential direction, multi-chamber bearing with a journal of a roll supported therein;

FIG. 2 is a sectional view of a first embodiment of the present inventive hydrostatic bearing at a start-up mode in which the temperature difference between the stationary outer and the rotating inner bearing parts is zero;

FIG. 3 is the same view as is FIG. 2, however, in an operational state at maximum operational temperature;

FIG. 7 is a third embodiment of the inventive bearing in an axial view that is partially cut away; and FIG. 8 is a sectional view taken along line VIII—VIII of FIG. 7.

DETAILED DESCRIPTION OF THE PRESENT INVENTION

Figure 4:
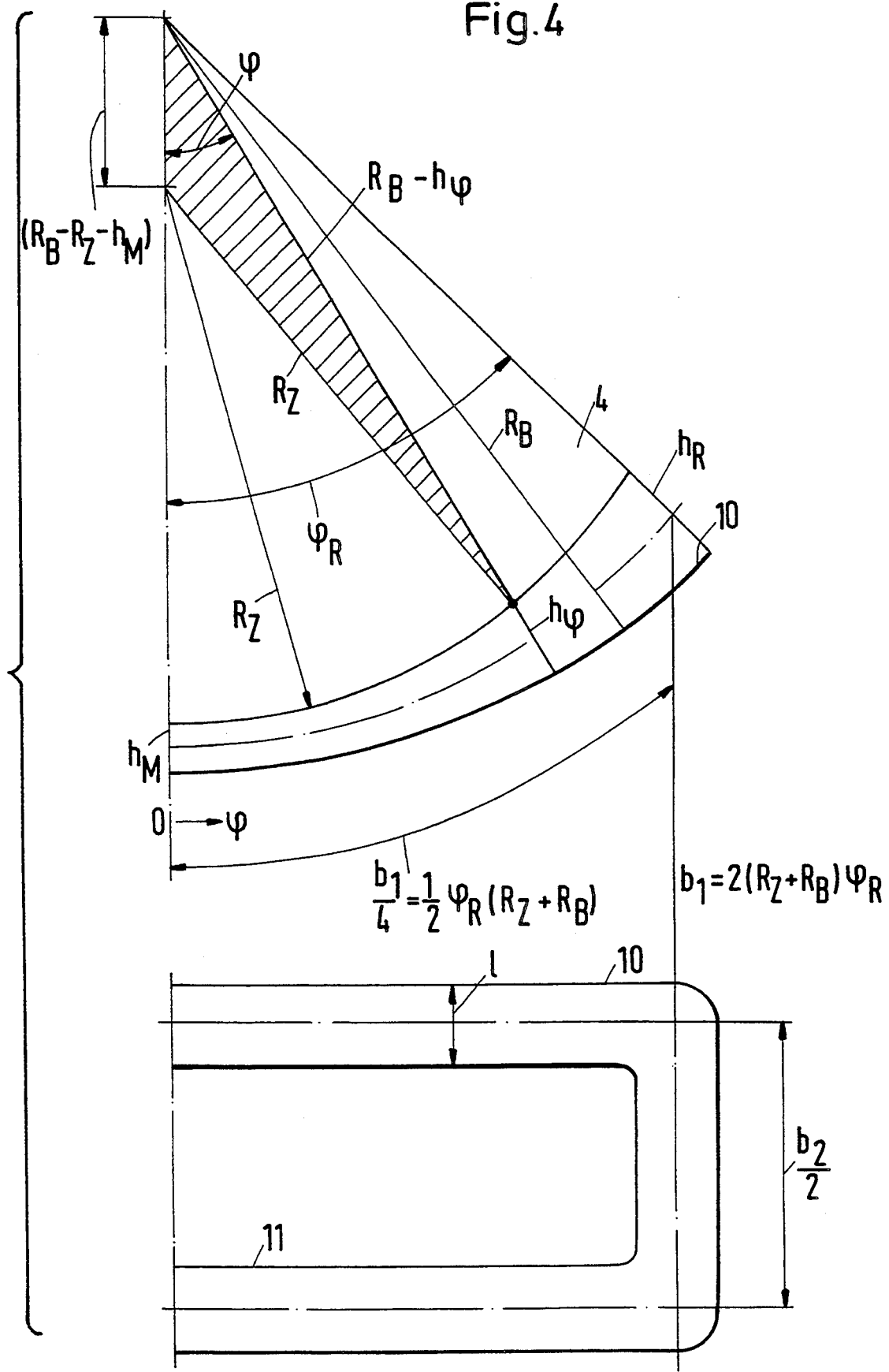
FIG. 4 is a sectional view of the bearing according to FIGS. 2 and 3, showing an axial view of both rotating bearing parts and further showing a top view of a bearing pocket of a stationary bearing part to explain the calculations of a simulated gap height between the concentric bearing surfaces.

Referring now to FIG. 1 a simulated bearing according to the present invention is illustrated. The bearing functions as a bearing for a heated roll of a compact calendar. Heating of the roll is achieved by supplying a heated medium at, for example, 275° C. to the roll through a bore 1 of bearing journal 2. The bore 1 has preferably been clad with an insulation material 3. Surrounding the bearing journal 2 is a first bearing ring 4 which, by way of a key 5, is non-rotationally connected to bearing journal 2. A second bearing ring 6 surrounds the first bearing ring 4, which is non-rotationally supported in bearing housing 7. The bearing housing itself is surrounded by an outer insulation 8. A running gap 9 is located between rings 4 and 6 to which oil is supplied in a manner which, for the sake of clarity, is not illustrated in this Figure. Thus, a hydrostatic bearing is created in the running gap 9. The bearing rings 4 and 6 represent, in a circumferential direction, a closed hydrostatic multi-chamber bearing where the height of the running gap, in spite of the presence of insulations 3 and 8, and thereby the hydrostatic gap height (and eccentricities), fluctuate to such an extent that economically intolerable oil volume flows can be expected. For example, with a temperature $v$ of the heating medium of about 275 ° C., a medial $v_{mi}$ of the inner bearing pans of about 140° C., a running gap temperature of about 130° C., and a medial temperature of $v_{ma}$ of the outer bearing parts of about 110° C., a temperature difference of $\Delta v \approx 30°$ C. can result. For example, with a medial bearing diameter of D=900 mm, the result would be a diameter change of $\Delta D$ of about 320 μm with a temperature difference of $\Delta v = 30°$ C. between the inner and outer bearing parts. Without the insulations 3 and 8, one could expect that $\Delta D \approx 1$ mm.

Starting, for example, with a given medial gap height of 80 μm under maximum operating conditions, for the start-up mode (that is, an equal temperature between the inner and the outer bearing parts) 80 μm $+\frac{1}{2}\times 320$ μm =240 μm must be established as the base medial gap height.

According to the principle of "Hagen-Poiseuille", the oil volume flow is proportional to the third exponent of the gap height, and thereby in a start-up mode, the flow of the oil volume $(240/80)^3 = 27$ times greater than would be the case of 80 μm gap height (at maximal operating temperature).

When, contrary to the known closed bearing ring, only a bearing segment is used on the load of the bearing, which preferably occupies only about a quarter of the circumference, it is now possible, with the example above, to choose the construction dimensions as follows: The plus or minus deviations of the concentric gap which are shown in the examples illustrated in FIG. 2 are for the start-up mode (0). The examples illustrated in FIG. 3 are for the full or maximal operating conditions. The illustrated relationships of FIG. 3 are under maximal temperature at $v_{max}$. The indices used to indicate magnitudes in FIGS. 2 and 3, have the following meanings: M=middle; Z=journal; R=edge; B=bore.

Referring now to FIG. 4, the bearing segment 10 is illustrated as a half and includes an oil pressurized bearing pocket 11. Furthermore, for the calculation model, a cylindrical bearing shape is being assumed. Because of the varying temperature differences $\Delta v$ between the inner and the outer bearing parts and the attendant thermally induced radii changes, there can be only one operating point with a concentric gap.

reasons based on a functional integrity and minimizing the oil volume flow, it makes sense to locate this ideal point, between start-up mode (0) and full operating condition ($v_{max}$) and under a maximum operating temperature, at about the upper third of the working extent, so that, for example, the gap deviation (hm $v_{max}$−hr $v_{max}$) is less than half of ($h_{Ro}$−$h_{Mo}$).

In the base formula, according to the principal of "Hagen-Poiseuille", to calculate the oil volume flow Q the following equation is used:

$$Q = \frac{\Delta P b h^3}{12 \eta l} \tag{0}$$

h corresponds, in the case of a real gap, to a changeable gap height, of the calculated gap height$_{rechn.}$involving concentric bearing surfaces, hereinafter called the simulated gap height.

When the pressure difference $\Delta P$, the dynamic oil tenacity $\eta$, the factor 12 and the overflow length 1 are combined into a constant K, then it is true that $Q = K b h^3{}_{recn}$. (b=the whole overflow width).

Considering the parameters according to FIG. 4, the following mathematical derivations are true:

Partial oil volume flow at the point $\phi$:

$$dQ = K \frac{1}{2}(R_z + R_B)d\phi \cdot h_\phi^3; \tag{2}$$

$$\left(\frac{1}{2}(R_z + R_B)d\phi \triangleq dB\right)$$

$$Q = 4 \int_0^{\phi_z} dQ + K b_2 h_R^3$$

$$4 \int_0^{\phi_2} dQ = 2(R_z + R_B) K \int_0^{\phi_2} h_\phi^3 d\phi;$$

$$\left(2(R_z + R_B) = \frac{b_1}{\phi_R}\right)$$

$$Q = K\left(\frac{b_1}{\phi_R}\int_0^{\phi_2} h_\phi^3 d\phi + b_2 h_R^3\right);$$

$(b = b_1 + b_2)$ $Q = K(b_1 + b_2)h^2_{reclun.}$ ($\triangleq$ equation (1))

$$h_{reclun.} = \sqrt[3]{\frac{\frac{b_1}{\phi_R}\int_0^{\phi_2} h_\phi^3 d\phi + b_2 h_R^3}{b_1 + b_2}}$$

The cosine set yields the following for the shaded triangle in FIG. 4:

$h_\phi = R_B - (R_B - R_z - h_M)\cos\phi -$ $\sqrt{R_Z^2 - (R_B - R_Z - h_m)^2(1 - \cos^2\phi)}$ Because the expression $(R_B-R_z-h_M)^2(1-COS^2{}_{100})$ when compared to $R^2_z$ is negligibly small, the following simplification is true:

$h_\phi=(R_8-R_Z)-(R_B-R_Z-h_M)\cos\phi \tag{3}$

The integration is therefore possible without iteration and yields the following:

$$\int_0^{\phi_2} h_\phi^3 d\phi = \phi_R(R_B - R_Z)^3 - \quad (4)$$

$$3(R_B - R_Z)^2(R_B - R_Z - h_M)\sin\phi_R +$$

$$\frac{3}{2}(R_B - R_Z)(R_B - R_Z - h_M)^2$$

$$(\phi_R + \sin\phi_R\cos\phi_R) -$$

$$\frac{1}{3}(R_B - R_Z - h_M)^3$$

$$(\sin\phi_R \cos L2\phi_R + 2\sin\phi_R)$$

The resulting equations of this derivation in the case of $h_m < h_R$ are also true for a reverse case where $h_m > h_R$. (Automatic rule for prefixes).

It is presupposed that an arcuate bearing shape, in the calculation mode, can be approximated by a cylindrical shape with a corresponding medial diameter. Using $\alpha$ as a linear thermal expansion coefficient of the bearing construction parts, the following is true:

$$R_{B\Theta max} = R_{B_0}(1 + \alpha(\Theta_{mo} - 20)) \quad (5)$$

$$R_{Z\Theta max} = R_{Z_0}(1 + \alpha(\Theta_{mi} - 20)) \quad (6)$$

When putting this into practice, it makes sense to predetermine the minimal gap heights $h_{Mo}$ and $h_{Rvmax}$, the medial diameter of the bearing bore at a room temperature $D_m$ or $R_{BO} = \frac{1}{2} D_m$ and the factor F by which the oil gap difference ($h_{Mvmax} - h_{Rvmax}$) should be smaller than the oil gap difference ($h_{Ro} - h_{Mo}$).

From equations (3), (5) and (6), a function for the radius of the journal $R_{ZO}$ can be derived:

(a depiction of the derivation has been omitted for brevity).

$$R_{Z0} = \frac{R_{B0} - h_{M0} + \frac{F}{\cos\phi_R}(R_{B0}(1 + \alpha(\Theta_{ma} - 20)) - h_{R\Theta max})}{1 + \frac{F}{\cos\phi_R}(1 + \alpha(\Theta_{mi} - 20))} \quad (7)$$

For a determination of $h_{Mvmax1}$ the equation (3) only needs to be rearranged:

$$h_{M\Theta max} = \frac{1}{\cos\phi_R}(h_{R\Theta max} - (1 - \cos\phi_R)(R_{B\Theta max} - R_{Z\Theta max})) \quad (8)$$

Thus, all parameters for the determination of the simulated gap heights $h_{rechn.}$ (2) as well as for the oil volume flow Q (1) are given.

Numerical examples:
Medial diameter of the bearing bore:
$D_m$ = medial value of 900 H 7
$D_m$ = 900.045 mm
$\rightarrow R_{B0}$ = 450.0225 mm
$\phi_R$ = 45°
$h_{M0}$ = 0.070 mm or 70 μm
$h_{R\Theta max}$ = 0.070 mm or 70 μm
$\alpha$ = 12 · 10$^{-6}$ (1/°C.)
$\Theta_{ma}$ = 110° C.
$\Theta_{mi}$ = 140° C.

F = 2.25, i.e. $h_{M\Theta max} - h_{R\Theta max} = \frac{1}{2.25}(h_{R0} - h_{M0})$ Results:

-continued

| | |
|---|---|
| equation (7): | $R_{Z_0}$ = 449.8294 mm |
| equation (3): | $h_{Ro}$ = 0.106 mm or 106 μm, Δh = 36 μm |
| equation (5): | $R_{B\Theta max}$ = 450.5085 mm      test |
| equation (6): | $R_{Z\Theta max}$ = 450.4772 mm      36 = 2.25 · 16 |
| equation (8): | $h_{M\Theta max}$ = 0.086 mm or 86 μm, Δh = 16 μm | equation (4): $\int_0^{\phi_2} h_{\phi 0}^3 d\phi = 4.6061 \cdot 10^{-4}$ mm$^3$ equation (4): $\int_0^{\phi_2} h_{\phi\Theta max}^{3d} \phi = 4.1476 \cdot 10^{-4}$ mm$^3$ The following flows from FIG. 4
$b_1 = 2\phi_R(R_B + R_Z)$
$b_{1o}$ = 1413.4841 mm
$b_{1\Theta max}$ = 1415.2650 mm
$b_{2o}$ = 375 mm (constructive determination)
$b_{2\Theta max}$ = 375.4725 mm
equation (2):
$h_{rechn.0}$ = 0.0893 mm or 89.3 μm
$h_{rechn.\Theta max}$ = 0.0788 mm or 78.8 μm With regard to the start-up mode, the oil volume flow is reduced by a factor of (240/89.3)$^3$=19.4, and with regard to the full operating condition and under maximum temperature, by a factor of (240/78.8)$^3$=28.3 when compared to a hydrostatic bearing that is completely closed over its entire circumference and has a concentric or annular running gap.

Figure 5:
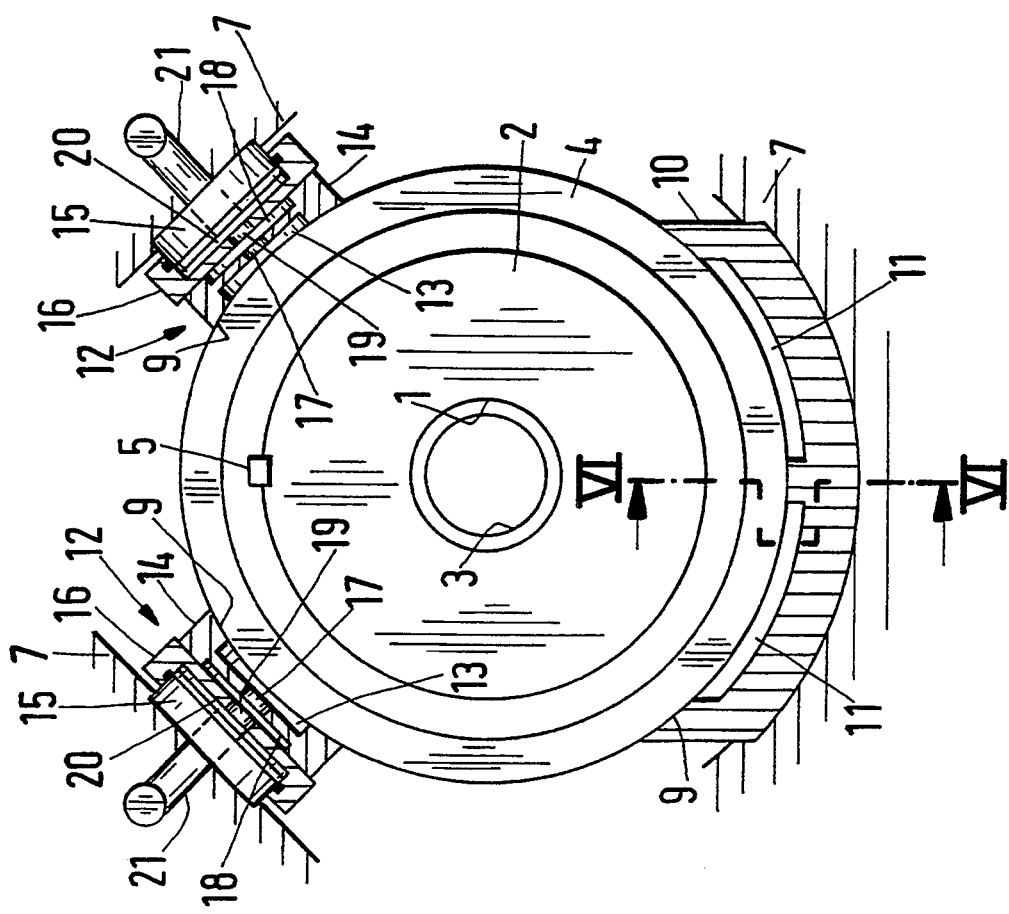
FIG. 5 is an axial view of a further embodiment of the present invention showing the bearing in a partially cut view.

Heated rolls in compact calendars have a substantially constant load direction based on static and dynamic influences and, therefore, allow for a fundamentally unsymmetrical construction of the bearings. Thus, only one radially fixed hydrostatic bearing segment 10 needs to be formed. Bearing segment 10 has only one bearing pocket 11 with oil flowing therethrough and is disposed on that side of the running gap 9 in the circumference where the bearing load occurs, as is illustrated in FIGS. 2 and 3. In other words, the arcuate bearing segment is disposed at a circumferential position which corresponds to a static load from the calendar roll. Additionally, in the diametrically oppositely disposed circumferential area, a further section of the stationary running surface is formed by two additional hydrostatic bearing segments 12. Each bearing segment 12 has a radially adjustable bearing pocket 13 with oil flowing therethrough and is located on that side of the running gap 9 where a bearing shoe 14 is disposed. As illustrated in FIG. 5, the radially fixed bearing segment 10 centers the bearing, and the radially moveable bearing segments 12 effect a required minimal pre-tensioning of the bearing pocket by controlling the oil volume flow with minimized compensation. For example, the compensation is based on the thermally induced fluctuating diameter differences between the inner and the outer bearing parts over the total working range. The required minimal pre-tensioning also includes a consideration of the effective direction of the roll's own weight.

The post adjustment or post guidance of the bearing segments, which are effective as additional bearings, can be achieved hydraulically by means of piston 15 and cylinder 16. Additionally, the position of the bearing segments can be adjusted mechanically as well.

The bearing pockets 13 have, at each of their bottom surfaces, a bore 17 formed therein and are connected to a mating sliding surface of bearing shoes 14. The bearing pockets 13 are fluidly connected to hydrostatic bearing pockets 18, which themselves are fluidly connected through bore 19 formed in the bottom of a neighboring cylinder 16 to a pressure chamber 20 of the piston-cylinder device 15, 16. The bearing pockets 13, 18 and the pressure chamber 20 are supplied with oil under constant pressure by way of line 21 through a pressure regulating valve.

Figure 6:
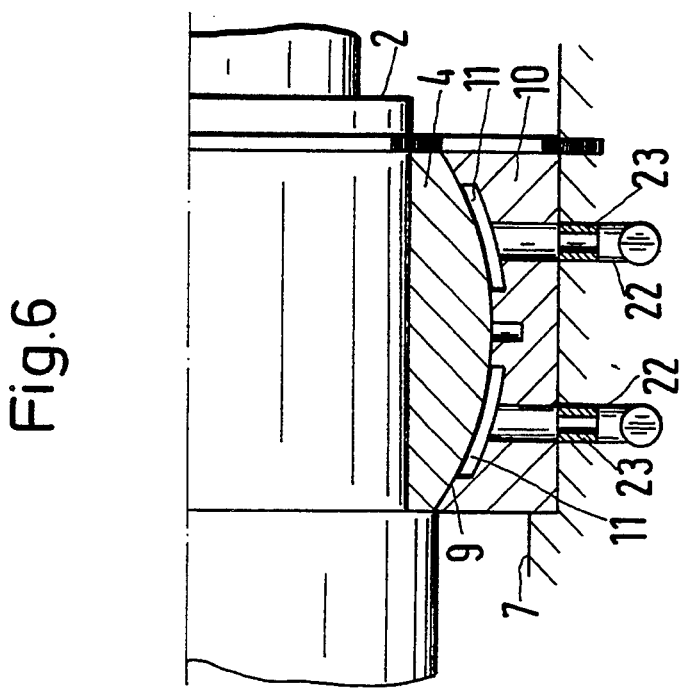
FIG. 6 is a sectional view taken along line VI—VI of FIG. 5.

The bearing shoes 14 practically operate friction-free and are self-centering relative to the bearing ring 4, which is rotating with the bearing journal 2. The bearing shoes 14 operate in concert with the diametrically oppositely disposed radially fixed bearing 10, which will be designated as the main bearing hereafter. The bearing ring 4 is formed as a bearing cup with a cylindrical indentation so that an arcuate bearing segment is obtained having cylindrical or arcuate glide surfaces (See FIG. 6).

Bearing segment 10, as illustrated in FIG. 5, is stationarily mounted in bearing housing 7, so that the whole of the bearings acts as a non-movable bearing at the end of the roll. Furthermore, bearing segment 10 has two bearing pockets 11 each of whose gap heights is chosen to be all inclusive in a manner similar to that of the embodiments shown in FIGS. 2-4 (described above), so that the bearing pockets 11, with reference to the gap height, act as only one bearing pocket.

The bearing pockets 11 are supplied with a constant oil volume flow over lines 22 (see FIG. 6), where the oil delivery to the bearing pockets 11 can be achieved over throttles 23, manifolds or individual pumps.

FIGS. 7 and 8 illustrate a movable bearing which is slidably movable at the other end of the roll to equalize for the thermal longitudinal expansions in the direction of double-arrow 24. For this purpose, bearing segment 10, on its side facing away or remote from running gap 9, has two bearing pockets 25, with oil flowing therethrough, which are connected with bearing pockets 11 through a bore 26.

The bearing pockets 18 on the side of bearing segment 12 and the bearing pockets 25 on the side of bearing segments 10 induce. However, a two-sided oil drainage and thereby a doubling of the oil volume flow. However, when compared to a hydrostatic bearing that is completely enclosed in its circumferential direction, as shown in FIG. 1, this embodiment still has a reduction of the oil volume flow by a factor of at least 4 to 5, but at a higher construction integrity.

From the foregoing description, it will be appreciated that the present invention makes available, a compact, cost efficient bearing for a heated roll. Having described the presently preferred exemplary embodiment of a new and improved bearing for a heated roll, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What we claim is:

1. A bearing for a heated calendar roll comprising:
 a bearing ring having a first surface, said bearing being rotatable about an axis:
 a first radially fixed hydrostatic bearing arcuate segment having a first surface which mates with said first surface of said bearing ring, said hydrostatic bearing having at least one bearing pocket, said bearing pocket having means for permitting hydraulic fluid to flow into said at least one bearing pocket, said hydrostatic bearing being disposed substantially at a circumferential position with respect to said bearing which corresponds to a bearing load from said calendar roll;
 a second hydrostatic bearing arcuate segment having a first surface which mates with said first surface of said bearing ring, said second hydrostatic bearing having a first radially adjustable bearing pocket, said radially adjustable bearing pocket having means for permitting hydraulic fluid to flow into said radially adjustable bearing pocket, said second hydrostatic bearing being disposed substantially diametrically opposite to said first hydrostatic bearing;
 a running gap being formed between said first surface of said first hydrostatic bearing and said first surface of said bearing ring, said running gap having a gap height which varies from a middle of said running gap toward an edge of said running gap such that at the beginning of a heating cycle the middle gap height is less than said edge gap height and in a heated state of said calendar roll the middle gap height is greater than said edge gap height.

2. The bearing according to claim 1, wherein the surfaces of said bearing ring, said first hydrostatic bearing and said second hydrostatic surface have an arcuate shape.

3. The bearing according to claim 2, wherein said at least one bearing pocket of said first bearing segment is supplied with a constant oil volume, and said bearing pocket of said second bearing segment is supplied with a constant oil pressure.

4. The bearing according to claim 1, wherein said second bearing segment has a second bearing pocket having means for permitting hydraulic fluid to flow into said second bearing pocket, said bearing pocket being disposed on a side remote from said running gap, said second bearing pocket being connected to one of a piston and a cylinder to radially adjust said first and second bearing pocket of said second bearing segment.

5. The bearing according to claim 1, wherein said first bearing segment has a second bearing pocket having means for permitting hydraulic fluid to flow into said second bearing pocket, said second bearing pocket being disposed on a side remote from said running gap.

6. The bearing according to claim 1, wherein said middle gap height is smaller at the beginning of the heating cycle than in said heated state.

7. The bearing according to claim 6, wherein said edge gap height is larger at the beginning of the heating cycle than in said heated state.

* * * * *